(12) United States Patent
Miwata et al.

(10) Patent No.: US 6,851,848 B2
(45) Date of Patent: Feb. 8, 2005

(54) TURBO-MOLECULAR PUMP HAVING RADIATION TEMPERATURE APPARATUS

(75) Inventors: Tooru Miwata, Chiba (JP); Manabu Nonaka, Chiba (JP); Takashi Kabasawa, Chiba (JP)

(73) Assignee: BOC Edwards Technologies Limited, Narashino (JP)

( * ) Notice: Subject to any disclaimer, the term of this patent is extended or adjusted under 35 U.S.C. 154(b) by 1 day.

(21) Appl. No.: 10/395,673

(22) Filed: Mar. 24, 2003

(65) Prior Publication Data

US 2003/0185272 A1 Oct. 2, 2003

(30) Foreign Application Priority Data

Mar. 28, 2002 (JP) .................................... 2002-090299

(51) Int. Cl.⁷ .............................................. G01K 1/16
(52) U.S. Cl. ........................... 374/120; 374/2; 374/141
(58) Field of Search ................. 374/141, 2, 120–121, 374/130–131, 126

(56) References Cited

U.S. PATENT DOCUMENTS

| | | | | |
|---|---|---|---|---|
| 3,598,136 A | * | 8/1971 | Zaginailoff | 137/828 |
| 4,032,944 A | * | 6/1977 | van Dongen et al. | 257/88 |
| 4,854,730 A | * | 8/1989 | Fraden | 374/164 |
| 6,214,034 B1 | * | 4/2001 | Azar | 607/89 |
| 6,443,616 B1 | * | 9/2002 | Brotz | 374/17 |
| 6,596,995 B1 | * | 7/2003 | Bender | 250/341.6 |
| 6,667,372 B1 | * | 12/2003 | Kajikawa et al. | 526/61 |
| 6,729,756 B2 | * | 5/2004 | Sezai | 374/2 |

FOREIGN PATENT DOCUMENTS

JP 58218673 A * 12/1983 ............ G01V/9/04

* cited by examiner

*Primary Examiner*—Christopher W. Fulton
*Assistant Examiner*—Yaritza Guadalupe
(74) *Attorney, Agent, or Firm*—Adams & Wilks

(57) ABSTRACT

A turbo-molecular pump has components including a stator column, a rotary shaft, and a blade connected to the rotary shaft for rotation therewith. A radiation temperature measuring apparatus has a radiation thermometer for measuring a temperature of a preselected one of the components of the turbo-molecular pump disposed within a view angle range of the radiation thermometer and in accordance with heat energy radiated from the preselected component. A hood is connected to the radiation thermometer so as to not interfere with the view angle range of the radiation thermometer and is configured to block heat energy radiated from components of the turbo-molecular pump disposed outside of the view angle range of the radiation thermometer.

27 Claims, 7 Drawing Sheets

TURBO-MOLECULAR PUMP HAVING RADIATION TEMPERATURE APPARATUS

BACKGROUND OF THE INVENTION

1. Field of the Invention

The present invention relates to a turbo-molecular pump equipped with a radiation temperature measuring apparatus capable of measuring the temperature of a measurement object based on infrared rays constituting heat energy radiated from the measurement object and improved in terms of accuracy in temperature measurement.

2. Description of the Related Art

With the recent development of electronics, there is a rapid increase in the demand for semiconductor devices such as memories and integrated circuits.

Such semiconductor devices are manufactured, for example, by doping a semiconductor substrate of very high purity with impurities to impart electrical properties thereto or by forming minute circuits on a semiconductor substrate through etching.

Furthermore, such manufacturing operation has to be conducted in a high-vacuum chamber in order to avoid the influence of dust, etc. in the air. To evacuate the chamber, a vacuum pump is generally used. In particular, as the vacuum pump, a turbo-molecular pump, which involves little residual gas and is easy to maintain, is widely used.

Further, a semiconductor manufacturing process involves a number of steps in which various process gases act on a semiconductor substrate, and the turbo-molecular pump is used not only to evacuate the chamber but also to discharge these process gases from the chamber. FIG. 6 is a longitudinal sectional view of the turbo-molecular pump.

In FIG. 6, a turbo-molecular pump 100 has at the upper end of an outer cylinder 127 an intake port 101. Inside the outer cylinder 127, there is provided a rotor 103 in the periphery of which a plurality of rotary blades 102a, 102b, 102c, . . . constituting turbine blades for sucking and discharging gas are formed radially in a number of stages.

Mounted at the center of the rotor 103 is a rotor shaft 113, which is supported so as to levitate and be positionally controlled by, for example, a so-called 5-axis control magnetic bearing.

An upper radial electromagnet 104 is composed of four electromagnets arranged in pairs in the X- and Y-axis directions. An upper radial sensor 107 composed of four electromagnets is provided in close vicinity to and in correspondence with the upper radial electromagnet 104. The upper radial sensor 107 detects radial displacement of the rotor 103 and sends the detection result to a control device (not shown).

Based on the displacement signal detected by the upper radial sensor 107, the control device controls the excitation of the upper radial electromagnet 104 through a compensation circuit with a PID adjusting function to adjust the upper radial position of the rotor shaft 113.

The rotor shaft 113 is formed of a material with high magnetic permeability (e.g., iron) or the like, and is attracted by the magnetic force of the upper radial electromagnet 104. Such adjustment is performed independently in the X- and Y-axis directions.

Further, a lower radial electromagnet 105 and a lower radial sensor 108 are arranged in the same manner as the upper radial electromagnet 104 and the upper radial sensor 107, adjusting the lower radial position of the rotor shaft 113 in the same manner as the upper radial position thereof.

Further, there are arranged axial electromagnets 106A and 106B, with a metal disc 111 provided on the lower portion of the rotor shaft 113 being therebetween. The metal disc 111 is formed of a material with high magnetic permeability such as iron. To detect axial displacement of the rotor shaft 113, there is provided an axial sensor 109, whose axial displacement signal is transmitted to the control device.

Furthermore, based on this axial displacement signal, the axial electromagnets 106A and 106B are excitation-controlled through the compensation circuit with PID adjusting function of the control device. The axial electromagnet 106A magnetically attracts the metal disc 111 upwardly, and the axial electromagnet 106B attracts the metal disc 111 downwardly.

In this way, the control device properly adjusts the magnetic force applied to the metal disc 111 by the axial electromagnets 106A and 106B to cause the rotor shaft 113 to magnetically levitate in the axial direction and to support it in a non-contact fashion.

A motor 121 is equipped with a plurality of magnetic poles circumferentially arranged so as to surround the rotor shaft 113. Each magnetic pole is controlled by the control device so as to rotate the rotor shaft 113 through an electromagnetic force acting between it and the rotor shaft 113.

Further, an RPM sensor 110 is mounted to the lower end of the rotor shaft 113. The control device detects the RPM of the rotor shaft 113 from a detection signal of the RPM sensor 110.

Further, in the vicinity, for example, of the lower radial sensor 108, there is mounted a phase sensor (not shown), which detects the rotation phase of the rotor shaft 113. By using the detection signals of the phase sensor and the RPM sensor 110, the control device detects the position of each magnetic pole.

A plurality of stationary blades 123a, 123b, 123c, . . . are arranged with slight gaps between the rotary blades 102a, 102b, 102c, . . . . The rotary blades 102a, 102b, 102c, . . . downwardly transfer the molecules of exhaust gas through collision. For this purpose, they are inclined by a predetermined angle from a plane perpendicular to the axis of the rotor shaft 113.

Similarly, the stationary blades 123 are inclined by a predetermined angle from a plane perpendicular to the axis of the rotor shaft 113, and are arranged alternately with the rotary blades 102 so as to extend toward the inner periphery of the outer cylinder 127.

Furthermore, each stationary blade 123 is supported, with its one end being inserted between a plurality of stationary blade spacers 125a, 125b, 125c, . . . stacked together.

The stationary blade spacers 125 are ring-like members formed, for example, of a metal, such as aluminum, iron, stainless steel, or copper, or an alloy containing some of these metals as the components.

In the outer periphery of the stationary blade spacers 125, there is secured in position the outer cylinder 127 with a slight gap therebetween. At the bottom of the outer cylinder 127, there is arranged a base portion 129, and a threaded spacer 131 is arranged between the lower portion of the stationary blade spacers 125 and the base portion 129. Additionally, formed in the lower portion of the threaded spacer 131 in the base portion 129 is an exhaust port 133, which communicates with the exterior.

The threaded spacer 131 is a cylindrical member formed of a metal, such as aluminum, copper, stainless steel, or iron, or an alloy containing some of these metals as the components, and has in its inner peripheral surface a plurality of spiral thread grooves 131a.

The spiral thread grooves 131a are oriented such that when the molecules of exhaust gas move in the rotating direction of the rotor 103, these molecules are transferred to the exhaust port 133.

At the lowermost portion of the rotary blades 102a, 102b, 102c, . . . of the rotor 103, a rotary blade 102d extends vertically downwards. The outer peripheral surface of this rotary blade 102d is cylindrical and protrudes toward the inner peripheral surface of the threaded spacer 131 so as to be in close vicinity to the inner peripheral surface of the threaded spacer 131 with a predetermined gap therebetween.

The base portion 129 is a disc-like member forming the base portion of the turbo-molecular pump 100, and is generally formed of a metal such as iron, aluminum, or stainless steel.

The base portion 129 physically supports the turbo-molecular pump 100, and also serves as a heat conduction path, so that it is desirable for the base portion 129 to be formed of a metal, such as iron, aluminum, or copper, which has rigidity and high heat conductivity.

In this construction, when the rotary blades 102 are driven by the motor 121 to rotate with the rotor shaft 113, exhaust gas from a chamber is taken in through the intake port 101 by the action of the rotary blades 102 and the stationary blades 123.

The exhaust gas taken in through the intake port 101 flows between the rotary blades 102 and the stationary blades 123 and is transferred to the base portion 129. At this time, the temperature of the rotary blades 102 rises due to the frictional heat generated when the exhaust gas comes into contact with the rotary blades 102 and the conduction of the heat generated in the motor 121, and the heat thus generated is transmitted to the stationary blades 123 side through radiation or conduction by the molecules of the exhaust gas.

The stationary blade spacers 125 are joined together in the outer periphery thereof, and transmit to the exterior the heat received by the stationary blades 123 from the rotary blades 102, the frictional heat generated when the exhaust gas comes into contact with the stationary blades 123, etc.

The exhaust gas transferred to the base portion 129 is sent to the exhaust port 133 while being guided by the thread grooves 131a of the threaded spacer 131.

While in the above-described example the threaded spacer 131 is arranged in the outer periphery of the rotary blade 102d, and the thread grooves 131a are formed in the inner peripheral surface of the threaded spacer 131, it is also possible, in some cases, to form the thread grooves in the outer peripheral surface of the rotary blade 102d and to arrange in its periphery a spacer having a cylindrical inner surface.

Further, in order that the gas taken in through the intake port 101 may not enter the electrical component section constituted of the motor 121, the lower radial electromagnet 105, the lower radial sensor 108, the upper radial electromagnet 104, the upper radial sensor 107, etc., the electrical component section is covered with a stator column 122, and the interior of the electrical component section is maintained at a predetermined pressure by a purge gas.

For this purpose, piping (not shown) is arranged in the base portion 129, and the purge gas is introduced through this piping. The purge gas introduced is sent to the exhaust port 133 by way of the gap between a protective bearing 120 and the rotor shaft 113, the gap between the rotor and stator of the motor 121, and the gap between the stator column 122 and the rotary blades 102.

In some cases, to increase reactivity, the process gas is introduced into the chamber while at high temperature. And, when cooled to a certain temperature while being discharged, the process gas may solidify and deposit a product in the exhaust system.

Furthermore, in some cases, such process gas attains low temperature in the turbo-molecular pump 100 to solidify, adhering to the inner surfaces of the turbo-molecular pump 100 to be deposited thereon.

As can be seen from a vapor pressure curve, when, for example, $SiCl_4$ is used as the process gas in an Al etching apparatus, a solid product (e.g., $AlCl_3$) is deposited to adhere to the inner surfaces of the turbo-molecular pump 100 under low vacuum (760 [torr] to $10^{-2}$ [torr]) and at low temperature (approximately 20 [C]).

When a deposit substance from the process gas is deposited on the inner surfaces of the turbo-molecular pump 100, this substance narrows the pump flow passage, resulting in a deterioration in the performance of the turbo-molecular pump 100.

The solidification and adhesion of such product is likely to occur in the portion near the exhaust port, which is at low temperature, and, in particular, near the rotary blades 102 and the threaded spacer 131. This has conventionally been coped with by winding a heater, a water-cooling tube, etc. (not shown) around the base portion 129, etc., and embedding a temperature sensor (e.g., thermistor) (not shown) in, for example, the base portion 129, maintaining the base portion 129 at a fixed temperature based on a signal from this temperature sensor through heating by the heater or cooling by the water-cooling tube (which is hereinafter referred to as TMS (temperature management system)).

Prior to normal operation of the turbo-molecular pump 100, the turbo-molecular pump 100, the semiconductor manufacturing apparatus, and the piping connecting them are heated at temperature over fixed one for a fixed period of time for degassing (hereinafter referred to as baking). Then, they are restored to room temperature, whereby it is possible to increase the degree of vacuum of the interior of the intake port of the turbo-molecular pump 100 and the interior of the chamber (which leads to an improvement in so-called ultimate pressure).

When the temperature of the rotary blades 102 of the turbo-molecular pump 100 exceeds the long-term permissible heat-resistant temperature (which is 150 [C] when the rotary blades are formed of an aluminum alloy), the turbo-molecular pump is affected by heat, and mainly the rotary blades 102 undergo a deterioration in strength, suffering breakage in the worst case.

The higher the set temperature of the TMS, the less likely the deposition of the product. Thus, it is desirable for the set temperature to be as high as possible. However, raising this set temperature results in a rise of the temperature of the portion around the rotary blades 102, which hinders heat dissipation of the rotary blades 102. As a result, the temperature of the rotary blades 102 rises, so that there is a fear of the service life of the rotary blades 102 being shortened and their suffering breakage or the like.

Similarly, the higher the baking temperature, the more improvement in ultimate pressure. Thus, it is desirable for the baking temperature to be as high as possible. However, when the baking temperature is too high, the temperature of the rotary blades 102 rises, so that there is a fear of the service life of the rotary blades 102 being shortened due to the heat.

Thus, it is desirable to monitor the temperature of the rotary blades 102. Conventionally, as shown, for example, in FIG. 6, a radiation thermometer 141 is embedded in the base portion 129, and directed to the bottom surface of the rotary blade 102d. However, the monitoring of the temperature of the rotary blade 102d involves the following inconvenience.

The portion of the base portion 129 in which the radiation thermometer 141 is embedded is susceptible to product deposition, which means the accuracy in temperature measurement is likely to be affected by the product.

Further, the radiation thermometer 141 is designed such that the closer to 1 the emissivity of the measurement object, the more accurate the measurement.

However, the material of the rotary blades 102 generally includes an aluminum alloy with nickel plating, etc. so that the emissivity of the blade surfaces is as low as 0.1 or less, resulting in a rather poor measurement accuracy.

Further, with respect to the measurement object, there exists a view angle (angle α in FIG. 7) for the radiation thermometer 141 within which measurement is possible. And, when, as shown in FIG. 7, the surface constituting the measurement object is the bottom surface of the rotary blade 102d, it is subject to the influence of backlight, and radiation heat from a non-measurement object outside the measurement region indicated by the view angle α, such as the base portion 129, enters the radiation thermometer 141 directly or after being reflected, resulting in a rather poor measurement accuracy.

SUMMARY OF THE INVENTION

The present invention has been made in view of the above-mentioned problem in the prior art. It is an object of the present invention to provide a turbo-molecular pump equipped with a radiation temperature measuring apparatus capable of measuring the temperature of a measurement object based on infrared rays constituting heat energy radiated from the measurement object and improved in terms of accuracy in temperature measurement.

Therefore, according to a structure of the present invention, a radiation temperature measuring apparatus for a turbo-molecular pump includes:

a radiation thermometer for measuring a temperature of a measurement object based on infrared rays constituting heat energy radiated from the measurement object; and a hood arranged so as not to interfere with a view angle range of the radiation thermometer and adapted to block radiation heat from a non-measurement object outside the view angle range.

In the present invention, the hood is arranged so as to surround the view angle range of the radiation thermometer, whereby radiation heat from a non-measurement object is blocked by the hood and does not easily enter the interior of the hood, thereby making it possible to improve the accuracy in temperature measurement.

Further, the inner surface of the hood may be coated with a coating material having an emissivity higher than that of an aluminum alloy or nickel.

Due to this arrangement, radiation heat entering the hood is easily absorbed, and radiation heat from a non-measurement object is reflected to prevent it from entering the radiation thermometer, making it possible to improve the accuracy in the measurement of the temperature of the measurement object.

Further, according to the present invention, there is provided a radiation temperature measuring apparatus for a turbo-molecular pump including:

a radiation thermometer for measuring a temperature of a measurement object based on infrared rays constituting heat energy radiated from the measurement object; and a groove in a semispherical configuration or with a semicircular section or a section with a corner of R1 or more formed in a measurement object so as to include a view diameter which is a range enclosed through crossing of a view angle range of the radiation thermometer and the measurement object.

Without such groove, the radiation heat from a non-measurement object is reflected by the surface constituting the measurement object and is likely to enter the radiation thermometer, thereby deteriorating the accuracy in temperature measurement. However, due to the provision of a groove which is semispherical or whose section is semicircular or whose corner is R1 or more in the surface constituting the measurement object, if radiation heat from a non-measurement object enters the measurement object to be reflected by the surface constituting the measurement object, it does not easily enter the radiation thermometer, thereby making it possible to improve the accuracy in temperature measurement.

Further, the surface of the groove may be coated with a coating material having an emissivity higher than that of an aluminum alloy or nickel.

Due to this arrangement, the emissivity of the measurement object becomes higher compared with that when there is no coating applied thereto.

Further, according to the present invention, there is provided a radiation temperature measuring apparatus for a turbo-molecular pump including:

a radiation thermometer for measuring a temperature of a measurement object based on infrared rays constituting heat energy radiated from the measurement object;

a hood arranged so as not to interfere with a view angle range of the radiation thermometer and adapted to block radiation heat radiated from a non-measurement object outside the view angle range; and a groove in a semispherical configuration or with a semicircular section or a section with a corner of R1 or more formed in a measurement object so as to include a range enclosed through crossing of an imaginary line defined by imaginarily extending a leading edge of the hood and the measurement object.

The edge line of the opening of the groove is situated outside the range surrounded by the imaginary line defined by the view angle of the radiation thermometer and the groove crossing the same, so that it is possible to prevent more effectively the radiation heat from a non-measurement object from being reflected by the surface constituting the measurement object and entering the sensor portion of the radiation thermometer.

Preferably, the radiation thermometer of the radiation temperature measuring apparatus is mounted on a stator column of the turbo-molecular pump. That is, direct passage of the process gas is not allowed in the gap between the stator column and the rotary blades, so that as compared with the case where the radiation thermometer is embedded in the base portion, adhesion of the product is less likely to occur. Thus, it is possible to prevent the product from being deposited in the groove to change the emissivity of the measurement object and to prevent the product from being deposited in the optical system of the radiation thermometer to change the measurement accuracy.

Further, it is also desirable to mount the radiation thermometer to a spacer. In this case, as compared with the case where the radiation thermometer is embedded in the base portion, the pressure is lower although passage of the process gas is allowed, with the temperature being high, so that adhesion of the product is less likely to occur. Thus, it is possible to prevent the product from being deposited in the groove to change the emissivity of the measurement object and to prevent the product from being deposited in the optical system of the radiation thermometer to change the measurement accuracy.

DETAILED DESCRIPTION OF THE PREFERRED EMBODIMENTS

Figure 1:
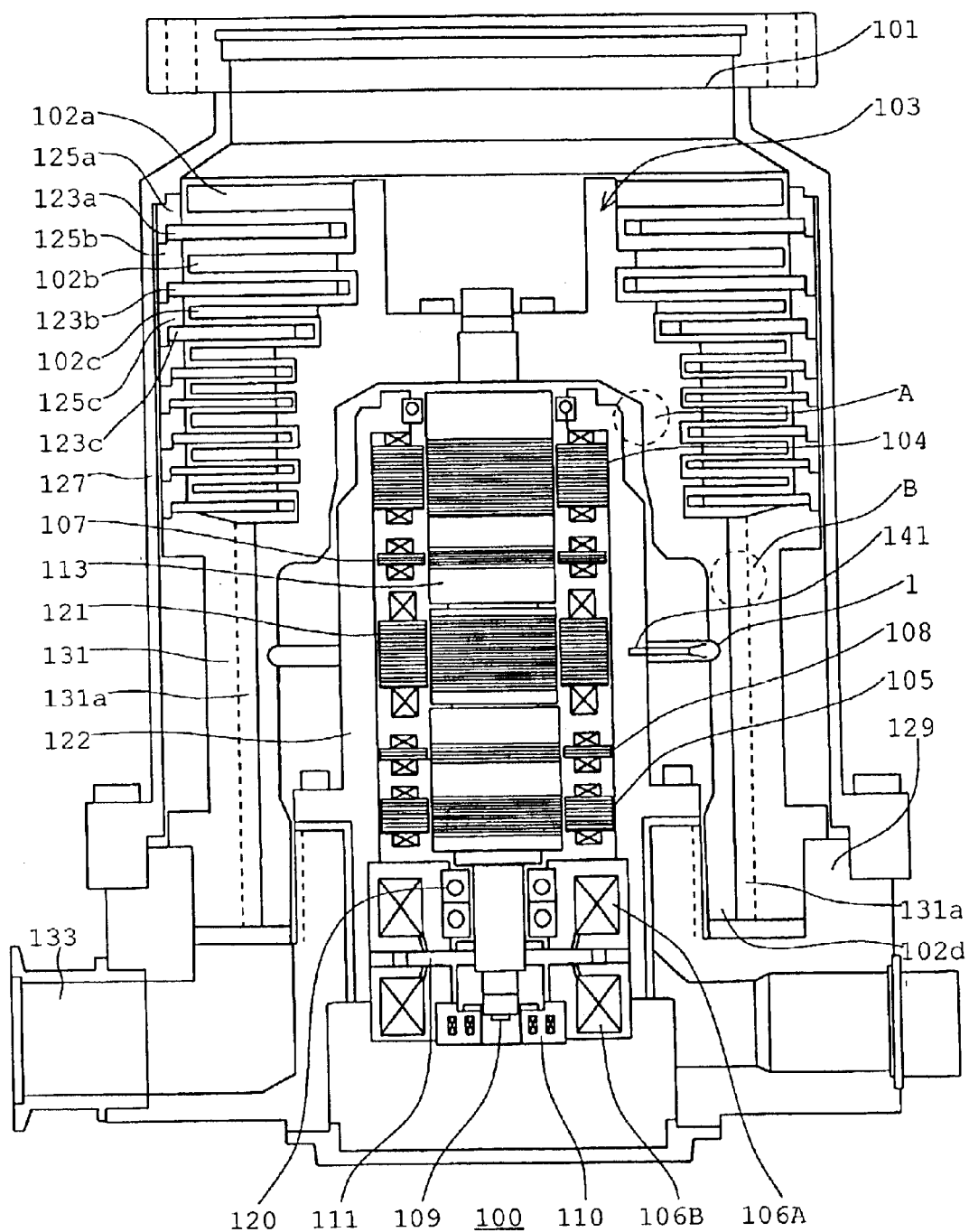
FIG. 1 is a schematic diagram showing a first embodiment of the present invention.
Figure 6:
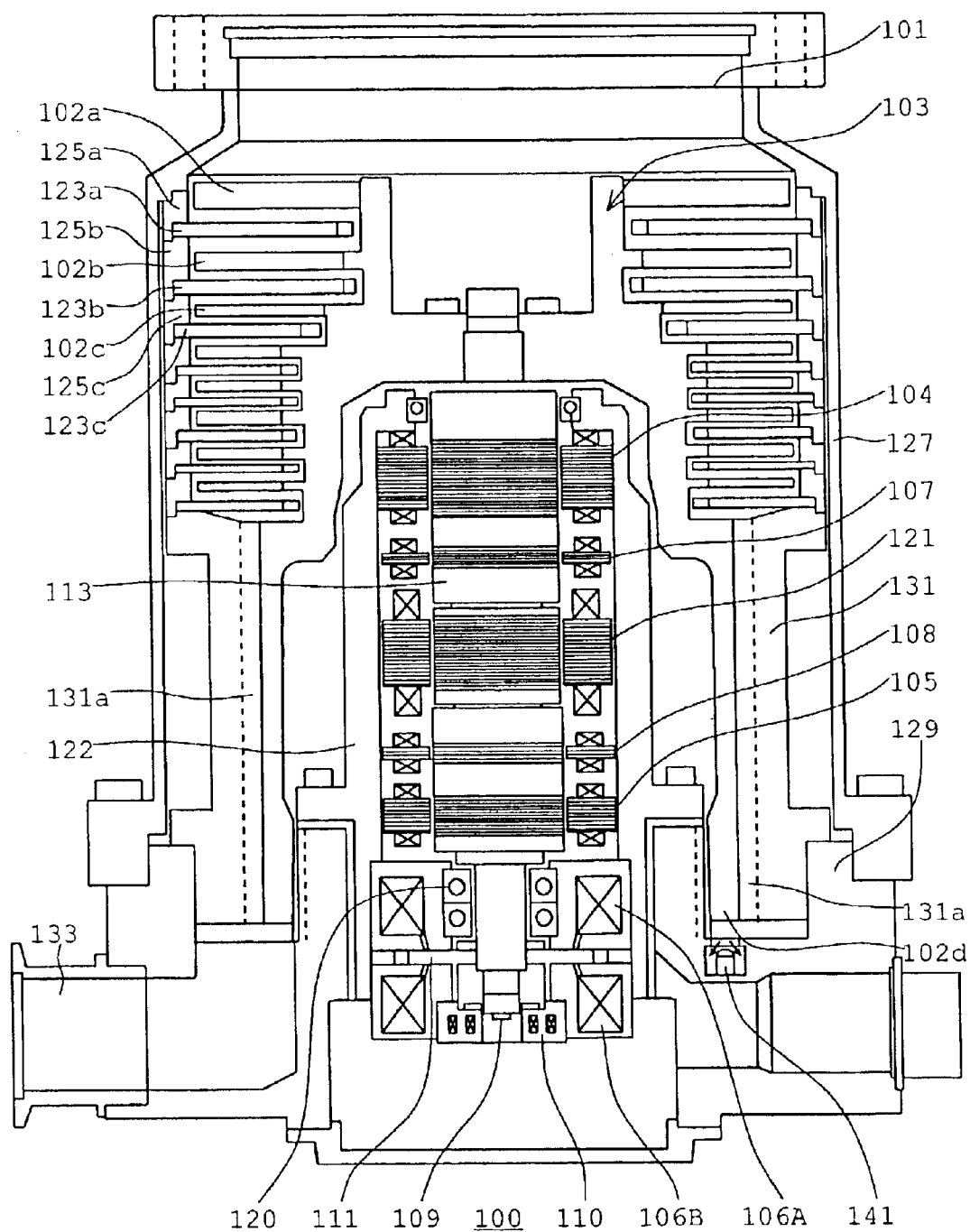
FIG. 6 is a longitudinal sectional view of a turbo-molecular pump.
Figure 7:
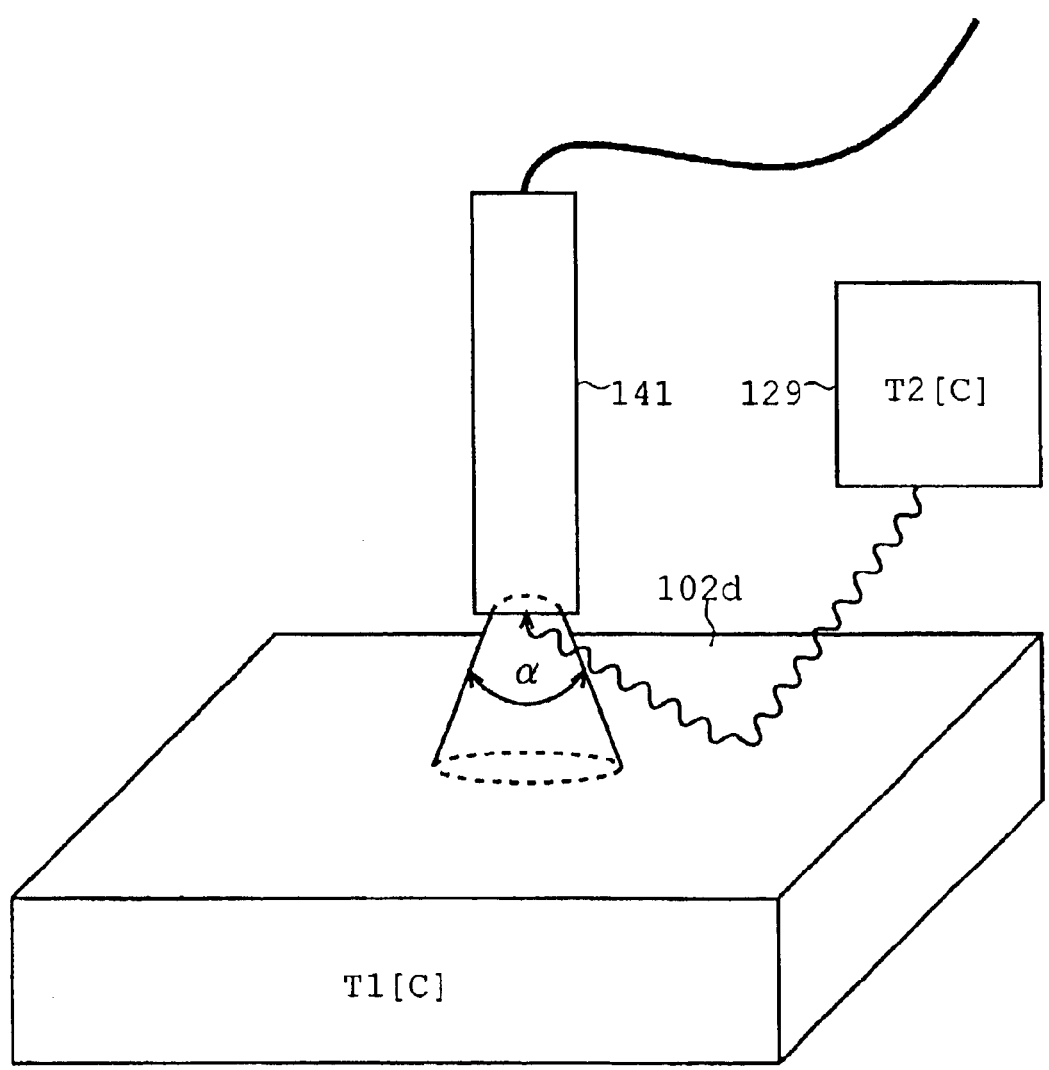
FIG. 7 is a diagram showing how radiation heat from a surface in a non-measurement range is reflected and enters the radiation thermometer.

A first embodiment of the present invention will now be described. FIG. 1 is a schematic diagram showing the first embodiment of the present invention. In the drawing, the components which are the same as those of FIG. 6 are indicated with the same reference numerals, and a description of such components will be omitted.

In FIG. 1, in the inner side surface of the rotary blade 102d, a groove 1 with a semicircular section is formed circumferentially and horizontally as seen in the drawing. The semicircular opening is directed toward the stator column 122. A radiation thermometer 141 is embedded in the stator column 122 such that its sensor portion is opposed to the groove 1. The radiation thermometer 141 is arranged near the motor 121.

Figure 2:
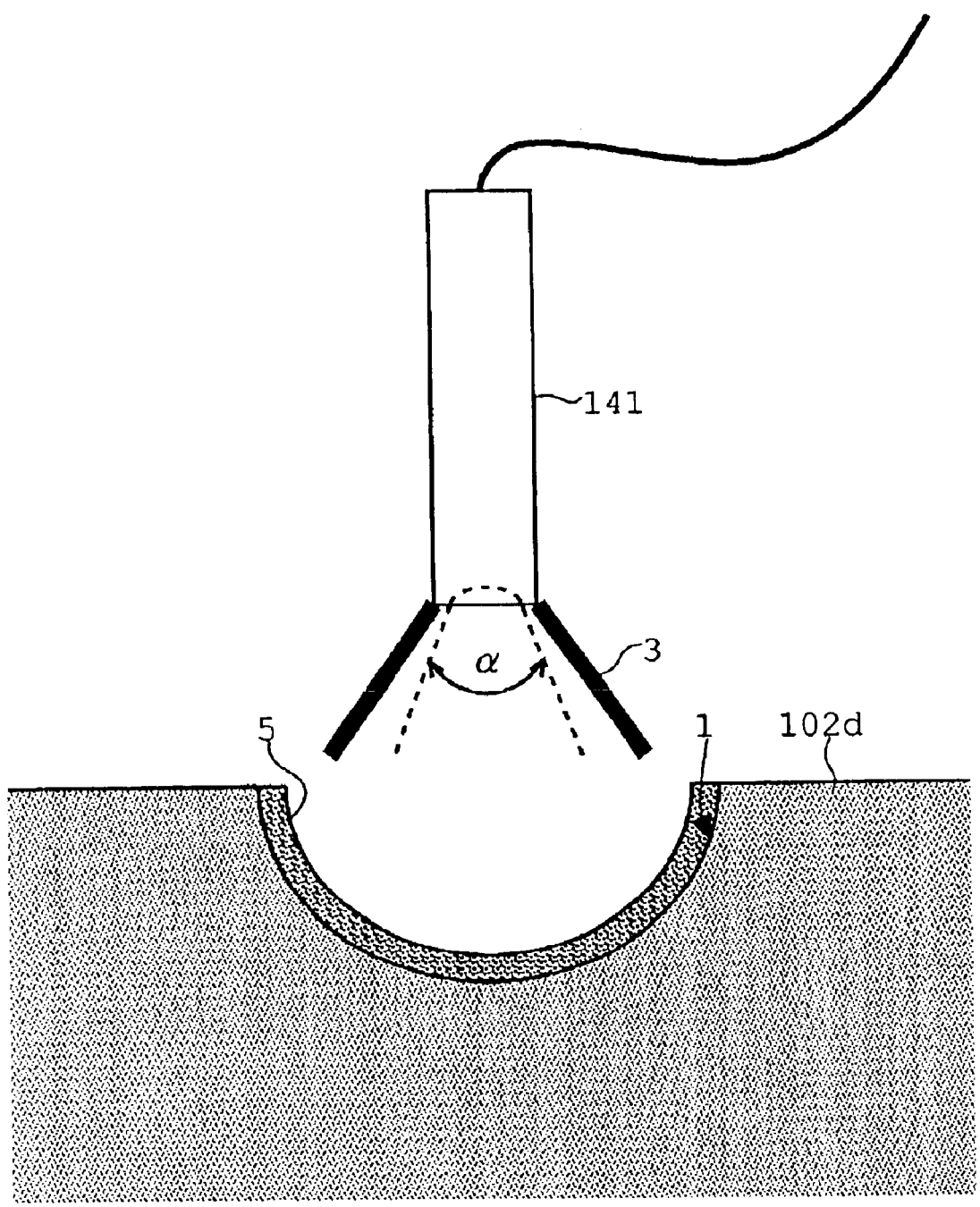
FIG. 2 is an enlarged view of a radiation thermometer and a groove.

FIG. 2 is an enlarged view of the radiation thermometer 141 and the groove 1. In FIG. 2, a conical hood 3 diverging toward the groove 1 is mounted to the radiation thermometer 141 so as to surround the view angle a of the radiation thermometer 141.

The opening area of the groove 1 is larger than the area of the region of the inner peripheral surface of the rotary blade 102d surrounded by an imaginary line as defined by this inner peripheral surface and the imaginary extension of the diverging leading edge of the hood 3 crossing each other. That is, the edge line of the opening of the groove 1 is situated outside the imaginary circle as defined by the imaginary extension and the inner peripheral surface crossing each other.

Furthermore, the inner peripheral surface of the groove 1 and the inner side surface of the hood 3 are coated, as indicated at reference numeral 5, with a coating material having an emissivity higher than that of an aluminum alloy or nickel.

In this construction, the hood 3 is arranged so as to surround the view angle α of the radiation thermometer 141, so that radiation from the non-measurement range is blocked by the hood 3 and does not easily enter the interior of the hood 3. Further, since the edge line of the opening of the groove 1 is situated outside the above-mentioned imaginary crossing circle, radiation heat from a surface in the non-measurement range is reflected by the surface of the rotary blade 102d, and does not enter the sensor portion of the radiation thermometer 141.

Further, the groove 1 and the radiation thermometer 141 are arranged in the region between the stator, column 122 and the rotary blade 102d, where the purge gas, which is a pure gas, passes. And, as compared with the portion of the base portion 129 in which the radiation thermometer 141 is embedded as shown in FIG. 6, this region between the stator column 122 and the rotary blade 102d provides an environment relatively free from product deposition since the process gas does not pass therethrough directly. Thus, it is possible to prevent product deposition in the groove 1 leading to a change in the emissivity of the measurement object and to prevent product deposition in the optical system of the thermometer leading to a change in the measurement accuracy.

Further, due to the coating 5 of the inner peripheral surface of the groove 1 with a coating material having an emissivity higher than that of an aluminum alloy or nickel, the emissivity of the measurement object is higher than when there is no coating 5, whereby it is possible to improve the accuracy in the measurement of the temperature of the object.

Further, by providing the coating 5 also on the inner side surface of the hood 3, radiation heat entering the hood is easily absorbed, and radiation heat from a non-measurement object is reflected to prevent it from entering the radiation thermometer 141, making it possible to improve the accuracy in the measurement of the temperature of the object.

Figure 3:
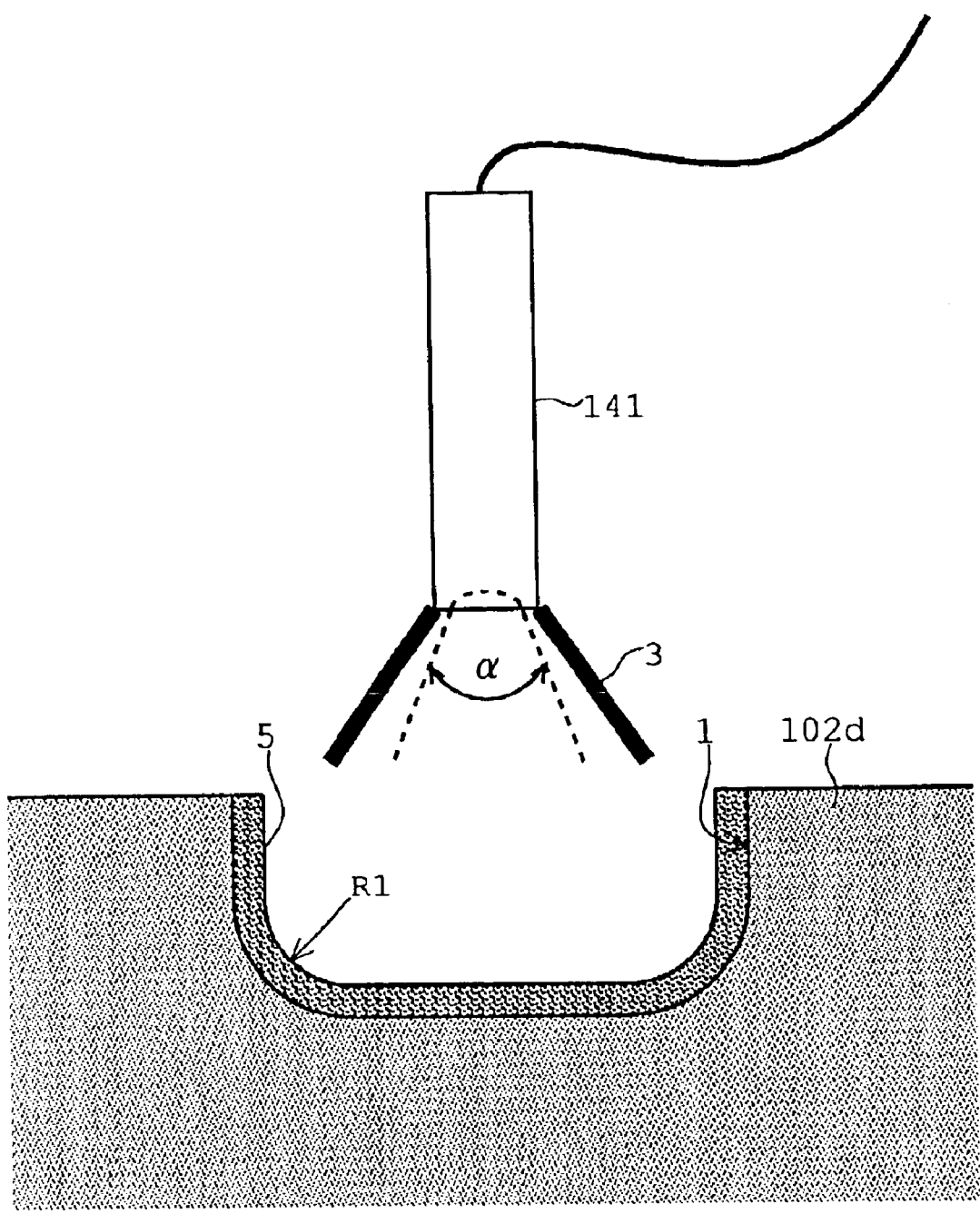
FIG. 3 is an enlarged view of a groove with a corner of R1 or more.

When there is radiation heat from a surface in the non-measurement range, due to the semicircular section of the groove 1, any radiation heat from a non-measurement object reflected by the surface constituting the measurement object does not easily enter the radiation thermometer, thus making it possible to improve the accuracy in temperature measurement. Of course, the groove 1 is not restricted to the peripheral one; it may also consist of a semispherical dent (in which case the section of the groove 1 is the same as that shown in FIG. 2). Further, the section of the groove 1 is not restricted to the semicircular one; as shown in FIG. 3, it may also be a rectangular one with a corner of R1 or more.

Further, due to the provision of the hood 3, it is possible to reduce the probability of radiation heat from a non-measurement object entering the sensor portion of the radiation thermometer 141 as compared with the case in which there is no hood 3. Thus, it is possible to improve the accuracy in temperature measurement.

Figure 4:
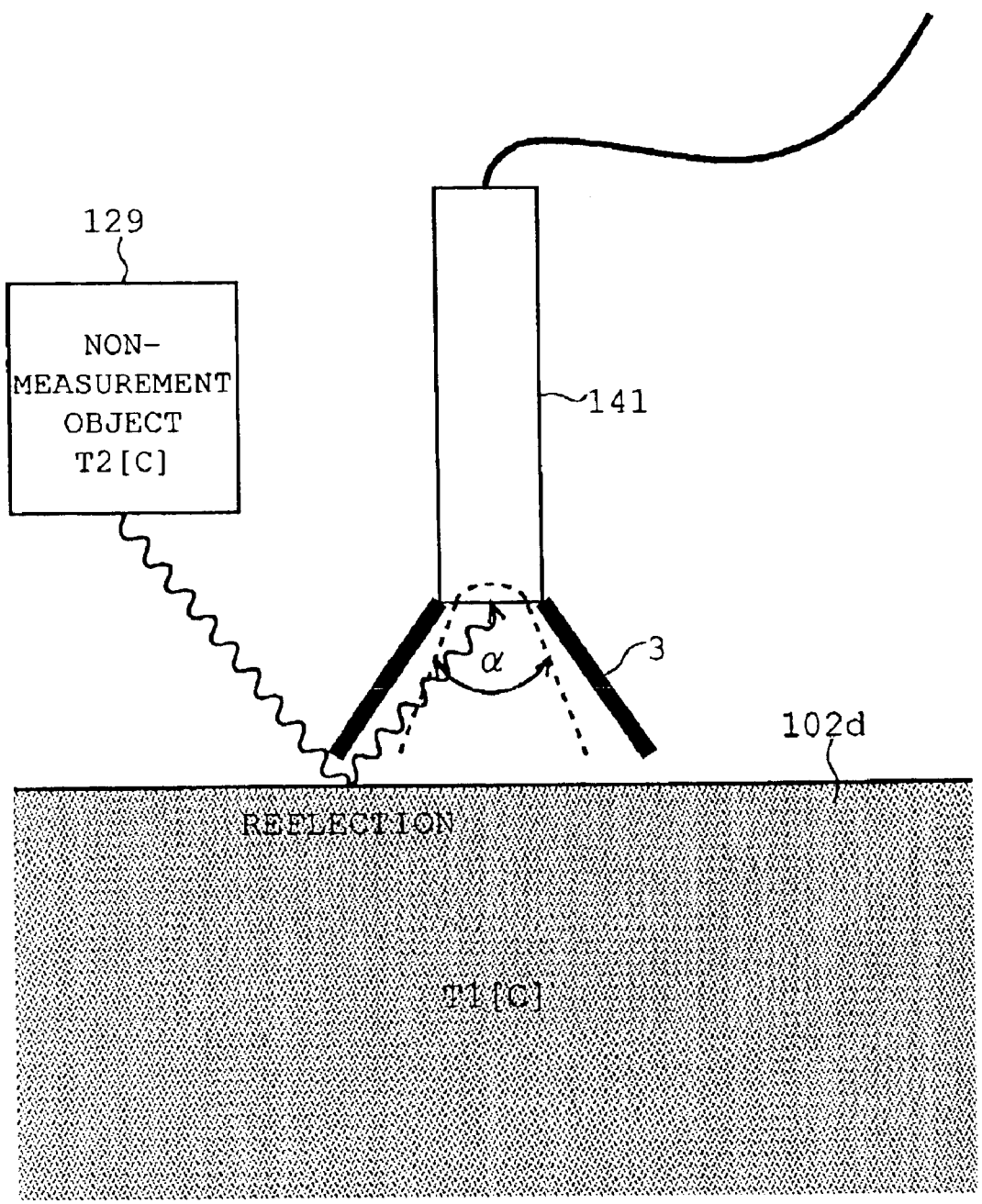
FIG. 4 is a diagram showing how, when there is no groove, radiation heat from a surface in the non-measurement range is reflected and enters the radiation thermometer.

In the case where only the hood 3 is provided and no groove 1 is formed, radiation heat from a non-measurement object, as shown in FIG. 4, gets around the hood 3 and is reflected by the surface constituting the measurement object to enter the radiation thermometer 141, resulting in a deterioration in the accuracy in temperature measurement.

The arrangement position for the groove 1 and the radiation thermometer 141 is not restricted to the region between the stator column 122 and the rotary blade 102d near the motor 121; it may also be position A or B encircled in FIG. 1.

In the case of position A, the groove 1 and the radiation thermometer 141 are arranged between the stator column 122 and the rotary blade 102d near the upper radial electromagnet 104. In this case, they are arranged, as in the above-described case, in the region between the stator column 122 and the rotary blade 102d, where the purge gas, which is a pure gas, passes, and the region is less subject to product deposition, making it possible to further improve the accuracy in temperature measurement.

In the case of position B, the groove 1 and the radiation thermometer 141 are arranged in the region between the rotary blade 102d and the threaded spacer 131. The radiation thermometer 141 is embedded in the body portion of the threaded spacer 131, and the hood 3 can be arranged by utilizing the space of the thread grooves 131a of the threaded spacer 131.

The groove 1 is circumferentially formed in the outer periphery of the rotary blade 102d. In this case also, as compared with the case where the radiation thermometer 141 is embedded in the base portion 129 as shown in FIG. 6, although passage of the process gas is allowed, this region is at lower pressure and at higher temperature, so that it provides an environment less subject to product deposition. Thus, it is possible to prevent product deposition in the groove 1 leading to a change in the emissivity of the measurement object and to prevent product deposition in the optical system of the radiation thermometer leading to a change in the measurement accuracy.

Figure 5:
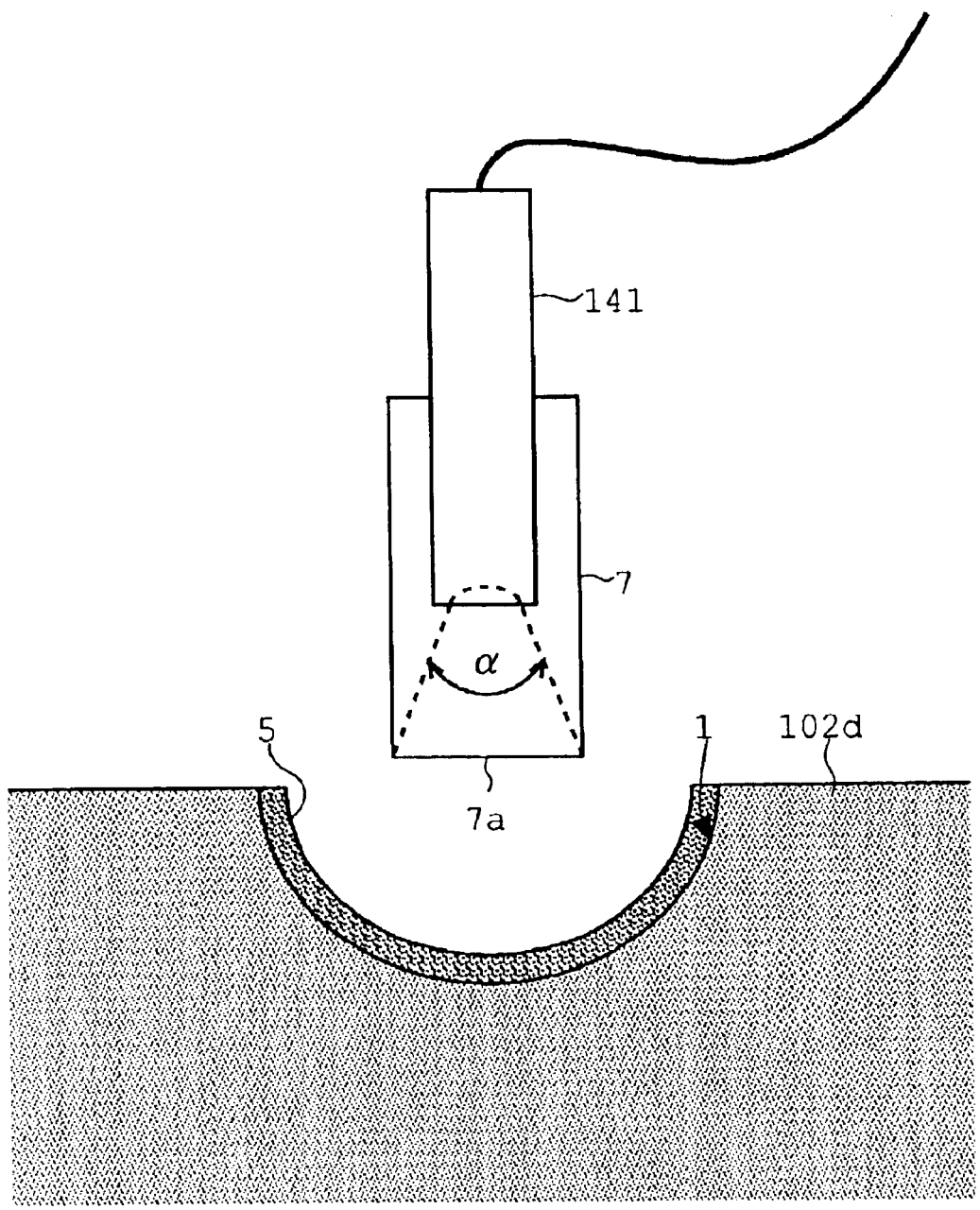
FIG. 5 is a schematic diagram showing a second embodiment of the present invention.

Next, a second embodiment of the present invention will be described. FIG. 5 is a schematic diagram showing the second embodiment of the present invention. The components which are the same as those of FIG. 2 are indicated with the same reference numerals, and a description of such components will be omitted.

In FIG. 5, there is provided a cylindrical hood 7, which is mounted to the outer peripheral wall portion of the cylinder of the radiation thermometer 141. The hood 7 has at its bottom an opening 7a, which is directed to the groove 1. The hood 7 is arranged so as not to intersect the view angle α of the radiation thermometer 141 and as to protrude by a predetermined length from the leading edge of the radiation thermometer 141.

This helps to obtain the same effect as that of the first embodiment of the present invention.

As described above, in accordance with the present invention, a hood is arranged so as to surround the view angle range of the radiation thermometer, whereby radiation heat from a non-measurement object is blocked by the hood and does not easily enter the interior of the hood, thereby making it possible to improve the accuracy in temperature measurement.

What is claimed is:

1. In combination: a turbo-molecular pump having a plurality of components; and a radiation temperature measuring apparatus having a radiation thermometer for measuring a temperature of a preselected one of the components of the turbo-molecular pump disposed within a view angle range of the radiation thermometer and in accordance with infrared heat energy radiated from the preselected component, and a hood connected to the radiation thermometer so as to not interfere with the view angle range of the radiation thermometer and configured to block heat energy radiated from components of the turbo-molecular pump disposed outside of the view angle range of the radiation thermometer.

2. A combination according to claim 1; wherein an inner surface of the hood is coated with a coating material having an emissivity higher than that of an aluminum alloy or nickel.

3. A combination according to claim 1; wherein the hood is generally conical-shaped so as to surround the view angle range of the radiation thermometer and to diverge toward the preselected component of the turbo-molecular pump.

4. A combination according to claim 1; wherein the hood is generally cylindrical-shaped so as to surround the view angle range of the radiation thermometer and has an opening confronting the preselected component of the turbo-molecular pump.

5. In combination: a turbo-molecular pump having a plurality of components, a preselected one of the components having a groove formed in a surface thereof, the groove having one of a generally semicircular-shaped and U-shaped cross-section; and a radiation temperature measuring apparatus having a radiation thermometer for measuring a temperature of the preselected component of the turbo-molecular pump in accordance with infrared heat energy radiated from at least a surface portion of the groove of the preselected component disposed within a view angle range of the radiation thermometer.

6. A combination according to claim 5; wherein the turbo-molecular pump has a stator column supporting the radiation thermometer and containing an electrical component section including at least a motor, a rotary shaft extending through the stator column, and a rotor blade mounted on the rotary shaft and enclosing a periphery of the stator column, and wherein the preselected component of the turbo-molecular pump comprises the rotor blade.

7. A combination according to claim 5; wherein the turbo-molecular pump has a stator column containing an electrical component section including at least a motor, a rotary shaft extending through the stator column, a rotor blade mounted on the rotary shaft and enclosing a periphery of the stator column, and a spacer supporting the radiation thermometer and connected to an outer periphery of the rotor blade, and wherein the preselected component of the turbo-molecular pump comprises the rotor blade.

8. A combination according to claim 5; wherein a surface of the groove is coated with a coating material having an emissivity higher than that of an aluminum alloy or nickel.

9. A combination according to claim 8; wherein the turbo-molecular pump has a stator column supporting the radiation thermometer and containing an electrical component section including at least a motor, a rotary shaft extending through the stator column, and a rotor blade mounted on the rotary shaft and enclosing a periphery of the stator column; and wherein the preselected component of the turbo-molecular pump comprises the rotor blade.

10. A combination according to claim 8; wherein the turbo-molecular pump has a stator column containing an electrical component section including at least a motor, a rotary shaft extending through the stator column, a rotor blade mounted on the rotary shaft and enclosing a periphery of the stator column, and a spacer supporting the radiation thermometer and connected to an outer periphery of the rotor blade, and wherein the preselected component of the turbo-molecular pump comprises the rotor blade.

11. In combination: a turbo-molecular pump having a plurality of components, a preselected one of the components having a groove formed in a surface thereof, the groove having one of a generally semicircular-shaped and U-shaped cross-section; and a radiation temperature measuring apparatus having a radiation thermometer for measuring a temperature of a preselected one of the components of the turbo-molecular pump disposed within a view angle range of the radiation thermometer and in accordance with infrared heat energy radiated from at least a surface portion of the groove of the preselected component, and a hood connected to the radiation thermometer so as to not interfere with the view angle range of the radiation thermometer and configured to block heat energy radiated from components of the turbo-molecular pump disposed outside of the view angle range of the radiation thermometer.

12. A combination according to claim 11; wherein the turbo-molecular pump has a stator column supporting the radiation thermometer and containing an electrical component section including at least a motor, a rotary shaft extending through the stator column, and a rotor blade mounted on the rotary shaft and enclosing a periphery of the stator column; and wherein the preselected component of the turbo-molecular pump comprises the rotor blade.

13. A combination according to claim 11; wherein the turbo-molecular pump has a stator column containing an electrical component section including at least a motor, a rotary shaft extending through the stator column, a rotor blade mounted on the rotary shaft and enclosing a periphery of the stator column, and a spacer supporting the radiation thermometer and connected to an outer periphery of the rotor blade; and wherein the preselected component of the turbo-molecular pump comprises the rotor blade.

14. A combination according to claim 11; wherein a surface of the groove is coated with a coating material having an emissivity higher than that of an aluminum alloy or nickel.

15. A combination according to claim 14; wherein the turbo-molecular pump has a stator column supporting the radiation thermometer and containing an electrical component section including at least a motor, a rotary shaft extending through the stator column, and a rotor blade mounted on the rotary shaft and enclosing a periphery of the stator column; and wherein the preselected component of the turbo-molecular pump comprises the rotor blade.

16. A combination according to claim 14; wherein the turbo-molecular pump has a stator column containing an electrical component section including at least a motor, a rotary shaft extending through the stator column, a rotor blade mounted on the rotary shaft and enclosing a periphery of the stator column, and a spacer supporting the radiation thermometer and connected to an outer periphery of the rotor blade; and wherein the preselected component of the turbo-molecular pump comprises the rotor blade.

17. A combination according to claim 11; wherein an inner surface of the hood is coated with a coating material having an emissivity higher than that of an aluminum alloy or nickel.

18. A combination according to claim 17; wherein the turbo-molecular pump has a stator column supporting the radiation thermometer and containing an electrical component section including at least a motor, a rotary shaft extending through the stator column, and a rotor blade mounted on the rotary shaft and enclosing a periphery of the stator column; and wherein the preselected component of the turbo-molecular pump comprises the rotor blade.

19. A combination according to claim 17; wherein the turbo-molecular pump has a stator column containing an electrical component section including at least a motor, a rotary shaft extending through the stator column, a rotor blade mounted on the rotary shaft and enclosing a periphery of the stator column, and a spacer supporting the radiation thermometer and connected to an outer periphery of the rotor blade; and wherein the preselected component of the turbo-molecular pump comprises the rotor blade.

20. A combination according to claim 11; wherein the hood is generally conical-shaped so as to surround the view angle range of the radiation thermometer and to diverge toward the groove of the preselected component of the turbo-molecular pump.

21. A combination according to claim 11; wherein the hood is generally cylindrical-shaped so as to surround the view angle range of the radiation thermometer and has an opening confronting the groove of the preselected component of the turbo-molecular pump.

22. A turbomolecular pump comprising:

a stator column;

a rotary shaft extending through the stator column and mounted to undergo rotation relative to the stator column;

a blade connected to the rotary shaft for rotation therewith and surrounding the stator column in spaced-apart relation thereto to define a space therebetween; and a radiation temperature measuring apparatus extending into the space between the blade and the stator column, the radiation temperature measuring apparatus having a radiation thermometer for measuring a temperature of at least a portion of the blade in accordance with heat energy radiated from the portion of the blade.

23. A turbo-molecular pump according to claim 22; wherein the portion of the blade is disposed within a view angle range of the radiation thermometer; and wherein the radiation temperature measuring apparatus has a hood connected to the radiation thermometer for blocking heat energy radiated from components of the turbo-molecular pump other than the blade and disposed outside of the view angle range of the radiation thermometer, the hood being connected to the radiation thermometer so as to not interfere with the view angle range of the radiation thermometer.

24. A turbo-molecular pump according to claim 23; wherein the hood is generally conical-shaped.

25. A turbo-molecular pump according to claim 23; wherein the hood is generally cylindrical-shaped.

26. A turbo-molecular pump according to claim 22; further comprising a groove formed in the portion of the blade; and wherein the radiation thermometer has a temperature detecting portion disposed opposite to and confronting the groove of the rotational blade.

27. A turbo-molecular pump according to claim 26; wherein the groove has an inner surface coated with a coating material having an emissivity higher than that of an aluminum alloy or nickel.

* * * * *